H. D. LATHROP & A. GAY.
COMPUTING ARRANGEMENT FOR WEIGHING SCALES.

No. 99,326.                              Patented Feb. 1, 1870.

Witnesses.                                       Inventor
D. B. Humphrey.                           H. D. Lathrop
S. H. Burridge                               A. Gay

United States Patent Office.

H. D. LATHROP AND ALBERT GAY, OF BEDFORD, OHIO.

Letters Patent No. 99,326, dated February 1, 1870.

IMPROVEMENT IN COMPUTING-ARRANGEMENT FOR WEIGHING-SCALES.

The Schedule referred to in these Letters Patent and making part of the same.

*To all whom it may concern:*

Be it known that we, H. D. LATHROP and ALBERT GAY, of Bedford, in the county of Cuyahoga, and State of Ohio, have invented certain new and useful Improvements in Computing-Scales; and we do hereby declare that the following is a full and complete description of the same, reference being had to the accompanying drawings, making part of this specification.

Objective.

This invention has for its object the construction of a pair of beam or platform weighing-scales, which, being provided with a system of figures inscribed on the beam, in combination with a revolving scale of figures arranged in relation therewith, the weight of any article, and the cost thereof at a given price per pound, may be ascertained, be the weight more or less, as hereinafter more fully described.

Drawings.

Like letters of reference refer to like parts in the different views.

Figure 1:
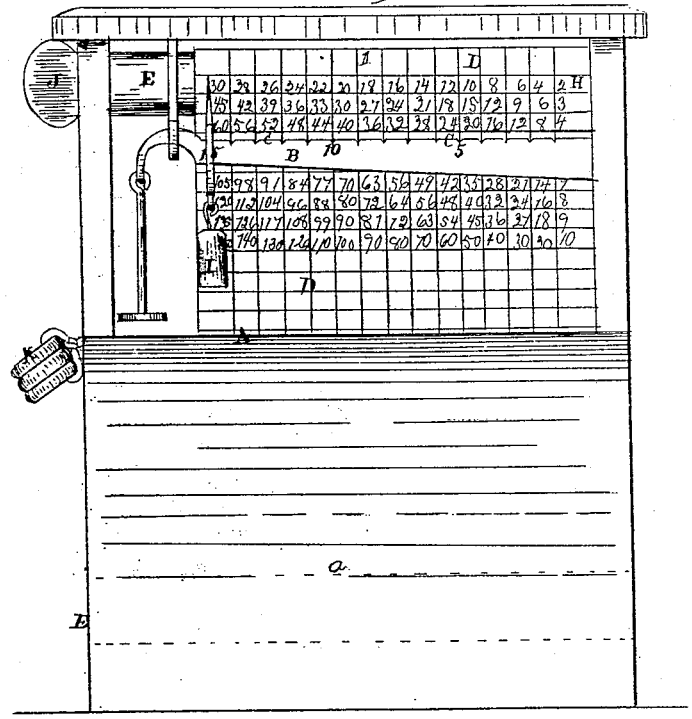
Figure 1 is a side view of the scale, with a system of figures of the first order.

A, fig. 1, represents a case, in which is arranged the beam B of the scale, connected to the platform and other parts of the weighing-apparatus, in the ordinary way, all of which is or may be constructed as those in ordinary use.

On the beam referred to is a scale of pounds, C, counting from the right to the left to the extent of fifteen pounds, with the fractional notations thereon marked in the usual way.

Immediately behind the beam is an endless apron, D, passing over and made to revolve by rollers E F, the lower roller F being indicated by the dotted lines *a*.

On said apron is printed a scale of computation or cost, G, which is read longitudinally, from right to left, or from left to right.

There is also inscribed upon the apron, the scale of prices, H, comprising the first right-hand column of figures, commencing at the top and reading them downward.

The practical application of the several scales of figures for weighing is as follows:

It is required to know how much fifteen pounds of flour will cost at two cents per pound. The article, on being placed upon the platform of the scale, the weight I, fig. 1, is then adjusted to the fifteen-pound notch, at the extreme end of the beam. The price per pound is seen at the first figure, 2, at the top of the right-hand column H. The cost of the fifteen pounds will be thirty cents, as indicated by the pointer at the extreme left of the first horizontal row of figures of the computing-scale. The cost of ten pounds will be shown by adjusting the weight along to the notch 10, on the beam. The pointer will indicate 20, as the cost of ten pounds at two cents per pound; and so on for any weight less than fifteen pounds—the beam showing the weight, the right-hand column the price, and the upper row G the cost.

The cost at three cents per pound is found by turning the apron, by the finger-piece J, so as to bring the second horizontal row of figures in range with the pointer, which will be at 45. The price at three cents and so on for any weight less than fifteen pounds, can be found by adjusting the weight along on the beam. For ten pounds the cost would be thirty cents; for five pounds, fifteen cents. At ten cents per pound, (the highest price indicated, which, however, may be continued to any extent,) it is $1 50, seen at the lowest left-hand corner of the scale of figures.

Figure 2:
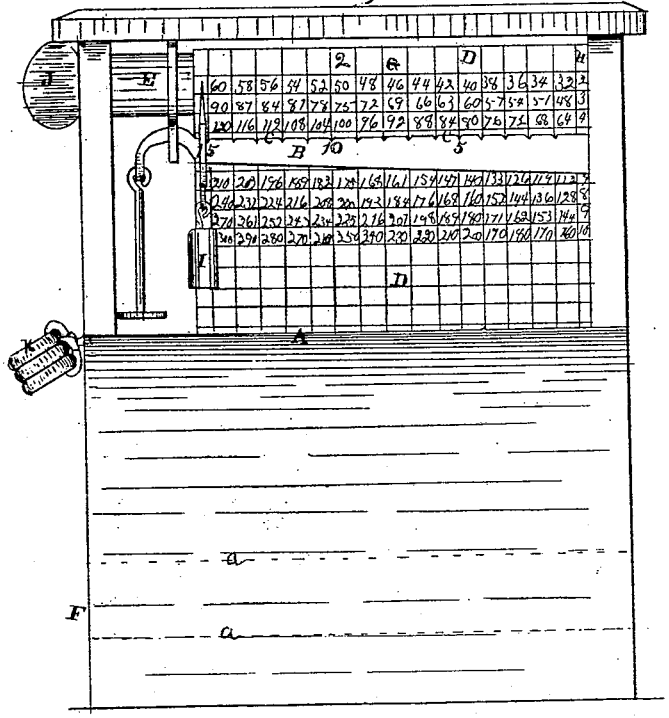
Figure 2 is a side view of the scale, with a system of figures of the second order.

By hanging one of the three weights, *k*, fig. 2, on the end of the beam, fifteen pounds is added to the weighing-capacity of the beam, making thirty pounds instead of fifteen, which, at two cents per pound, will be sixty cents, as indicated by the pointer, as the cost.

On moving the weight along to the notch 10, twenty-five pounds will be the weight, which, at two cents, will be fifty cents. On adjusting the weight at 5, twenty pounds will be the weight, which, at two cents, will be forty cents; and so on, for any number of pounds less than thirty, the upper horizontal row will give the cost, the column H the price, and the beam the weight.

The cost at different prices is found, as in the first instance, by turning the apron until the pointer shall range with the column of price, and which is on the the same line as that of the cost.

By the addition of another weight, K, fifteen pounds is again added, and a third scale of figures on the apron, arranged in a similar manner as the above, will give the results consequent of the additional weight; and so on, the addition of a third weight. A fourth scale, calculated for the difference of weight, will, in like manner, indicate the cost at any given price.

It will be obvious, that by this arrangement of figures is obtained an easy way to learn the cost of any article at a given price, thereby saving much time in the matter of computation.

The arrangement of the matter is simple and easily learned, and can be practised by any one able to read figures.

What we claim as our improvement, and desire to secure by Letters Patent, is—

The revolving apron D, provided with a scale of cost, G, and scale of price, H, as arranged in relation to each other, to operate in combination with the scale-beam B, in the manner substantially as and for the purpose set forth.

H. D. LATHROP.
ALBERT GAY.

Witnesses:
   W. H. BURRIDGE,
   J. H. BURRIDGE.